United States Patent

[11] 3,588,327

[72] Inventors Karol Siwko;
Joseph Edward Thomas, Batavia, N.Y.
[21] Appl. No. 813,572
[22] Filed Apr. 4, 1969
[45] Patented June 28, 1971
[73] Assignee Sylvania Electric Products Inc.

[54] DC BLANKING AND IMAGE REPRODUCER BIAS ADJUSTING CIRCUITRY
11 Claims, 2 Drawing Figs.

[52] U.S. Cl. .......... 178/5.4R
[51] Int. Cl. .......... H04n 9/18
[50] Field of Search .......... 178/5.4, 5.4 (MC)

[56] References Cited

UNITED STATES PATENTS 2,901,534 8/1959 Oakley .......... 178/5.4

*Primary Examiner*—Richard Murray
*Attorneys*—Norman J. O'Malley, Donald R. Castle and Thomas H. Buffton

ABSTRACT: The bias potential applied to an image reproducer from an amplifier means having a bias potential developing means is varied by adjustment of an alterable impedance in a circuit network means DC coupled to the amplifier means and to a pulse amplifier means coupled to a pulse signal source.

PATENTED JUN 28 1971 3,588,327

INVENTORS
KAROL SIWKO &
JOSEPH E. THOMAS
BY
Donald R. Castle
ATTORNEY

DC BLANKING AND IMAGE REPRODUCER BIAS ADJUSTING CIRCUITRY

BACKGROUND OF THE INVENTION

In image reproduction systems and particularly in color television receivers employing a color image reproducer, it is a common practice to provide a bias potential adjusting system for the image reproducer. Therein a plurality of color difference amplifier stages are coupled to the image reproducer and to a so-called "blanker" stage which is, in turn, coupled to a periodic pulse source.

More specifically, a periodic pulse signal available from a "-flyback" transformer in the horizontal output stage of the color television receiver provides a pulse signal which is applied to a "blanker" stage. Normally, this "blanker" stage includes a discharge device having a first output electrode coupled by way of a load resistor to a potential source in the range of about 200 to 300 volts DC. A second output electrode of the "blanker" stage is coupled to a color synchronization section wherein proper reproduction of the color image is controlled.

The first output electrode of the "blanker" stage is AC coupled by way of a series connected alterable impedance and capacitor to first input electrodes connected in common of a plurality of color difference amplifier stages and via a common impedance to a potential reference level such as circuit ground. The color difference amplifiers each include a second input electrode having bias developing circuit means coupled thereto and an output electrode coupled to a separate input electrode of the color image reproducer.

In operation, the capacitor of the series connected alterable impedance and capacitor is charged from a potential source (B+) during intervals between application of a pulse signal from the pulse signal source to the "blanker" stage. Upon application of a positive pulse to the "blanker" stage, the capacitor discharges through the discharge device of the "blanker" stage causing application of a pulse signal to the common impedance and color difference amplifiers. In turn, the applied pulse signal causes development of a bias potential in the color difference amplifier stages due to grid current flow therein which alters the potential at the output electrodes of the color difference amplifier stages and the bias potentials applied to the color image reproducer.

Since the pulse signals applied to the common impedance and the color difference amplifier electrodes connected in common are AC coupled from the "blanker" stage, it can be deduced that the operation of the color difference amplifiers is dependent upon the magnitude of charge stored by the capacitor. As a result, it has been found that a relatively large and relatively expensive capacitor is required. Moreover, it is well known that a signal loss occurs when a capacitor charging system is employed.

Further, it has been found that adjustment of the alterable impedance tends to vary the impedance as seen from the input electrode of the color difference amplifier stages and the common impedance. Thus, the common impedance, wherein signal matrixing is usually effected, is undesirably affected by adjustments to the bias potentials applied to the color image reproducer.

OBJECTS AND SUMMARY OF THE INVENTION

Therefore, it is an object of the present invention to provide enhanced bias potential adjusting circuitry for an image reproducer system. Another object of the present invention is to provide an improved blanking pulse signal system. A further object of the invention is to provide improved bias potential adjusting circuitry applicable to semiconductor devices and using relatively low potential B+ sources.

These and other objects, advantages and capabilities are achieved in one aspect of the invention by an image reproducer bias adjusting system which includes a circuit network coupled to a pulse amplifier coupled to a pulse signal source and including an alterable impedance DC coupled to amplifier means DC coupled to an image reproducer. Varying the alterable impedance alters the magnitude of pulse signal DC coupled to the amplifier means which varies the bias potential developed therein and the bias potential applied to the image reproducer.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
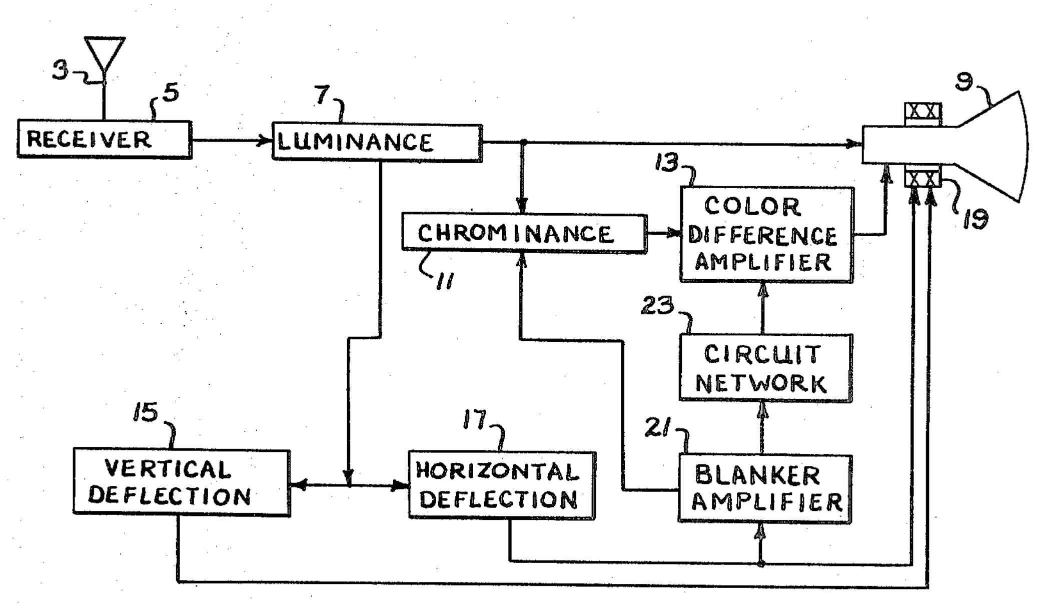
FIG. 1 illustrates in block form, a color television receiver employing one embodiment of the invention.

Referring to the drawings, FIG. 1 illustrates a color television receiver which includes the usual antenna 3 coupled to a signal receiver 5 having the normal RF and IF amplifier, mixer, and detector stages. A luminance channel 7 couples signals representative of brightness information from the signal receiver 5 and applies these signals to a color image reproducer 9.

The luminance channel 7 also provides a composite signal which is applied to a chrominance channel 11. Therein, signal information representative of color difference signals is derived which is applied to a plurality of color difference amplifier stages 13 and then to signal input electrodes of the color image reproducer 9.

The luminance channel 7 also provides an output signal which is applied to vertical deflection circuitry 15 and horizontal deflection circuitry 17. The vertical and horizontal deflection circuitry 15 and 17 develops signals which are applied to a deflection yoke and convergence assembly 19 associated with the color image reproducer 9.

Also, the horizontal deflection circuitry 17 serves as a source of periodic pulse signals which are applied to a blanker amplifier stage 21. The blanker amplifier stage 21 develops blanking signals which are DC coupled to a circuit network 23. The circuit network 23 includes an alterable impedance which varies the magnitude of the blanking signals. These blanking signals are DC coupled to the color difference amplifier stages 13 which are, in turn, DC coupled to the color image reproducer 9. Moreover, signals from the blanker amplifier stage 21 are also applied to the chrominance channel 11 and serve to control the application of signals therefrom to the color difference amplifier stages 13.

In operation, an intercepted television signal processed by the signal receiver 5 is applied to the luminance channel 7. Therein, signals representative of brightness information are derived and applied to the color image reproducer 9. Also, signals from the luminance channel 7 representative of color information are applied to the chrominance channel 11 and via the color difference amplifier stages 13 to the color image reproducer 9.

Further, the luminance channel 7 provides signals which are applied via vertical and horizontal deflection circuitry 15 and 17 to a deflection yoke and convergence assembly 19 to effect control over the movement of an electron beam of the color image reproducer 9. Moreover, signals available from the horizontal deflection circuitry 17, in the form of periodic pulse signals, are applied to a blanker amplifier stage 21 and circuit network 23 including an alterable impedance whereby control of the magnitude of bias potential developed by the color difference amplifier stages 13 and bias potential applied to the color image reproducer 7 is effected. Also, the blanker amplifier stage 21 provides signals for controlling the operation of the chrominance channel 11.

Figure 2:
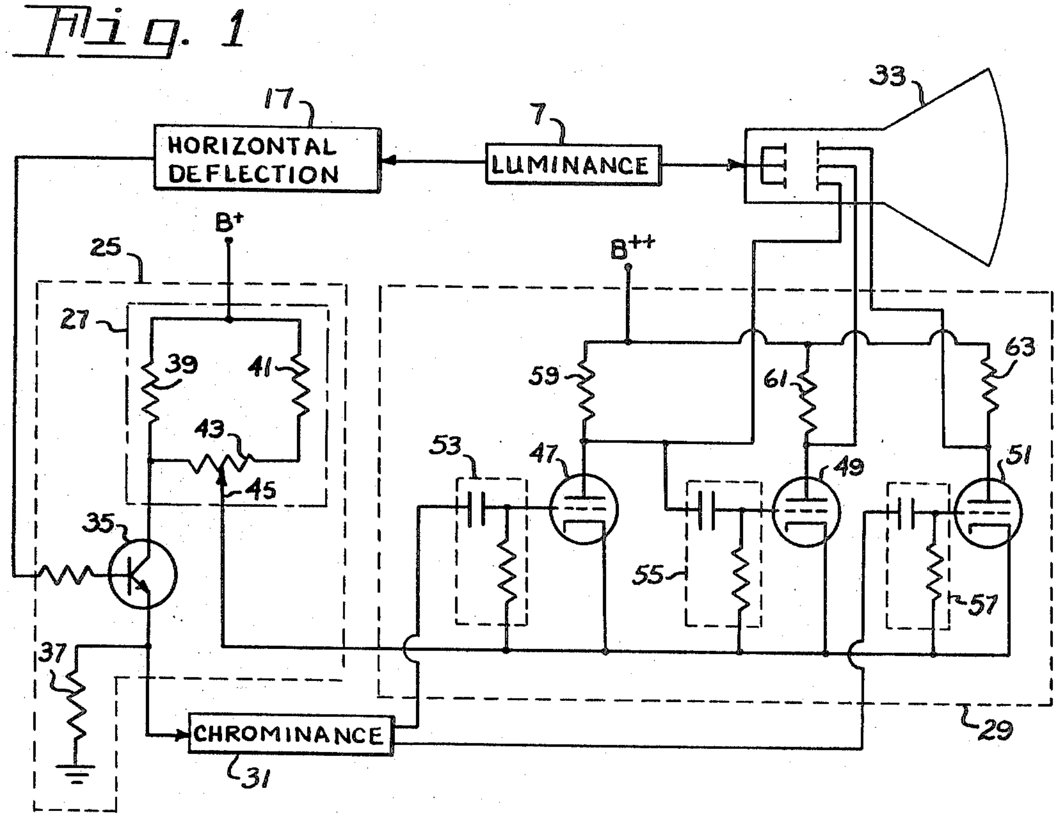
FIG. 2 is a schematic illustration of an image reproducer bias adjusting means suitable to the receiver of FIG. 1.

More specifically, FIG. 2 illustrates, in schematic form, a preferred DC blanking and image reproducer bias potential adjusting means. Therein, periodic pulse signals available from a pulse signal source, such as a horizontal deflection stage 17, are applied to a "blanker" amplifier stage 25. A circuit network 27 is directly coupled to the "blanker" amplifier stage 25 and provides a pulse which is DC coupled to a plurality of color difference amplifier stages 29. Another pulse from the "blanker" amplifier stage 25 is also applied to the chrominance channel 31 to render the chrominance channel 31 inoperative during retrace of the electron beam of the image reproducer 33. In turn, the color difference amplifier stages 29 are DC coupled to a color image reproducer 33.

Usually, the periodic pulse signal source is in the form of a winding on the "flyback" transformer of a horizontal deflection stage 17. Also, the "blanker" amplifier stage 25 preferably includes a transistor 35 having an input electrode or base coupled to the periodic pulse signal source of the horizontal deflection stage 17 and an output electrode or collector DC connected to a circuit network 27. A second output electrode or emitter is connected to the chrominance channel 31 and via a resistor 37 to a potential reference level such as circuit ground.

The circuit network 27 includes a first resistor 39 connecting the collector of the transistor 35 to a second potential source B which is preferably in the range of about 20 DC. A second resistor 41 and an alterable resistor 43 are connected in series and shunted across the first resistor 39. Also, the alterable resistor 43 has an adjustable arm 45.

The plurality of color difference amplifier stages 29 include a first, second, and third electron discharge device, 47, 49 and 51 respectively, each having a first input electrode or cathode connected in common with one another and DC connected to the adjustable arm 45 of the alterable resistor 43. Also, each of the discharge devices 47, 49 and 51 includes a second input electrode connected to a bias potential developing means 53, 55 and 57 respectively. The second input electrode of each of the first and third electron discharge devices 47 and 51 is also coupled to the chrominance channel 31. Moreover, the output electrode of each of the discharge devices 47, 49 and 51 is DC coupled to a separate input electrode of the color image reproducer 33 and via a load resistor 59, 61 and 63 respectively to a first potential source B++ which is preferably in the range of about 300 to 400$^{r}$ DC.

In operation, the horizontal deflection stage 17 serves as a source of periodic pulse signals, in this instance of a positive-going polarity, which are applied to the base of the transistor 35 of the "blanker" amplifier stage 25. Normally, these positive-going periodic pulse signals are in the form of "flyback" pulses occurring during the horizontal retrace intervals of electron beam scanning of the color image reproducer 33.

The transistor 35 of the "blanker" amplifier stage 25, which is normally biased to a nonconductive state, is driven into conduction upon application of the positive-going pulse signals to the base thereof. Thereupon, a signal of negative-going polarity becomes available at the circuit network 27. Also, a signal of positive-going polarity becomes available at the emitter electrode of the transistor 35.

The adjustable arm 45 of the alterable impedance 43 of the circuit network 27 selects a desired amplitude portion of the available signal and DC couples this signal of negative-going polarity to the cathode electrodes connected in common of the electron discharge devices 47, 49 and 51 respectively of the color difference amplifier stages 29. Moreover, the signal of positive-going polarity available at the emitter of the transistor 35 is applied to a color burst gate for example (not shown) and to the chrominance channel 31.

In this manner, the chrominance channel 31 is rendered substantially inoperative during the period of scan retrace of the color image reproducer 33 and the tendency for the establishment of undesired operational conditions of the color difference amplifier stages 29 and the appearance of undesired coloring of retrace lines on the image reproducer 33 is substantially eliminated. Since during this retrace time the DC bias of the chroma output stages 47, 49 and 51 is established (as will be shown later) the removal of chroma signal during this time in the chrominance channel is essential to provide the DC restoration reference bias for the chroma signal in the output stages.

Upon application of the pulse signals of negative-going polarity from the circuit network 27 to the cathodes or first input electrodes of the discharge devices 47, 49 and 51 of the color difference amplifier stages 29, current flows therein in an amount sufficient to cause current conduction in the second input electrodes and development of a biasing potential by each one of the bias potential developing means 53, 55 and 57. The magnitude of the developed bias potential is dependent upon the portion of the pulse signal selected by the adjustable arm 45 of the alterable impedance of the circuit network 27.

Further, it will be recognized that the developed bias potentials serve to set the operating point of the discharge devices 47, 49 and 51 which, in turn, has the effect of setting the potential of the output electrodes thereof, Moreover, the DC coupling of these output electrodes to the separate input electrodes of the color image reproducer 33 serves to establish the DC bias potential applied to each individual input electrode.

At this point it should perhaps be noted that the load resistors 59, 61 and 63, the electron discharge devices 47, 49 and 51, and the alterable resistor 43 are series connected intermediate the first potential source B++ and the output electrode of the "blanker" amplifier stage 25. This series circuitry, in conjunction with the first resistor 39 coupled intermediate the second potential source B+ and the output electrode of the "blanker" amplifier stage 25, serve to provide a voltage divider. Thus, the second potential source B+ serves to enhance the potential applied to the output electrode of the transistor 35 which, in turn, enhances the magnitude of the signal available from the first output electrode or emitter and applied to the chrominance channel 31. In this manner, the above-described DC connected voltage divider facilitates an output signal of increased magnitude from the "blanker" stage 25 for improved operational control of the chrominance channel 31.

Further, it should be noted that the first and second resistors 39 and 41 of the circuit network 27 are relatively large in comparison with the alterable impedance 43. Moreover, both the first and second resistors 39 and 41 are coupled to the second potential source B+. Thus, varying the alterable impedance 43 to provide the desired variations in bias potential applied to the color image reproducer 33 has little, if any, effect upon the total impedance of the circuit network 27. As a result, the matrixing to develop a color difference signal, which occurs in the circuit network 27, is substantially unaffected by the bias development means for the color image reproducer 33.

Thus, there has been provided a DC blanking and color image reproducer bias adjusting system suitable for use in a color television receiver and including the capability of employing a transistor. The system not only eliminates expensive components, thereby reducing costs and simplifying the apparatus, but also provides enhanced operational capabilities with reduced variations in color shift associated with matrix developed signals.

While there have been shown and described what is at present considered the preferred embodiments of the invention, it will be obvious to those skilled in the art that various changes and modifications may be made therein without departing from the invention as defined by the appended claims.

We claim:

1. In an image reproduction system employing an image reproducer having a signal input electrode, a DC blanking and reproducer bias adjusting means comprising in combination periodic pulse signal source means, and means coupling said source means to said signal input electrode of said image reproducer to effect alteration in the image reproducer bias potential, said coupling means including:

amplifier means employing an electron device having a first input electrode, a second input electrode including bias potential developing circuitry, and an output electrode DC coupled to a first potential source and to said signal input electrode of said image reproducer;

pulse amplifier means including an electron device having an input electrode coupled to said pulse signal source means and an output electrode; and circuit network means DC coupling said output electrode of said pulse amplifier means to a second potential source and including an alterable impedance DC coupled to said first input electrode of said amplifier means whereby adjustment of said alterable impedance varies the pulse potential applied to said amplifier means causing variation in the bias potential developed therein and the bias potential applied to said image reproducer.

2. The combination of claim 1 wherein said circuit network means includes a first impedance coupling said output electrode of said blanking pulse amplifier means to said second potential source and a series connected second impedance and alterable impedance shunting said first impedance.

3. The combination of claim 2 wherein said first, second and alterable impedances are in the form of resistors.

4. The combination of claim 1 wherein said electron device of said blanking pulse amplifier means is in the form of a transistor.

5. The combination of claim 1 wherein said first potential source is additively coupled to said second potential source to effect application of increased potential to the output electrode of said blanking pulse amplifier means causing an increase in signal potential available therefrom.

6. The combination of claim 1 wherein said alterable impedance is in the form of an adjustable resistor.

7. In a color television receiver having a color image reproducer with a plurality of signal input electrodes, DC blanking and reproducer bias adjustment means comprising in combination: periodic pulse signal source means, and means coupling said source means to said color image reproducer to effect alteration in the color image reproducer bias potentials, said coupling means including:

a plurality of signal translation amplifier stages each including an electron device having first input electrodes connected in common, second input electrodes each having bias potential developing circuitry coupled thereto, and output electrodes each DC coupled to a first potential source and to a separate signal input electrode of said color image reproducer;

blanking pulse amplifier means including an electron device having an input electrode coupled to said periodic pulse signal source and an output electrode; and circuit network means DC coupling said output electrode of said blanking pulse amplifier means to a second potential source and by an alterable impedance to said first input electrodes connected in common of said signal translation amplifier stages.

8. The combination of claim 7 wherein said circuit network means includes a first impedance DC coupling said output electrode of said blanking pulse amplifier means to said second potential source and an alterable impedance DC coupled to said second potential source and said output electrode of said blanking pulse amplifier means and having an adjustable arm DC coupled to said first input electrodes connected in common of said signal translation amplifier stages.

9. The combination of claim 7 wherein said circuit network includes a first impedance DC coupling said output electrode of said blanking pulse amplifier means to said second potential source and a series connected second impedance and an alterable impedance shunting said first impedance.

10. The combination of claim 7 wherein said first and second potential sources are coupled to effect application of a potential greater than said second potential source to said output electrode of said blanking pulse amplifier means whereby increased signal potential is available from said blanking pulse amplifier means.

11. The combination of claim 9 wherein said impedances are in the form of resistors.